Jan. 29, 1963  B. STAHMER  3,075,724
CABLE GUIDE MECHANISM FOR CONSTANT TENSION REEL
Filed May 15, 1961  3 Sheets-Sheet 1

FIG. I

INVENTOR.
B. STAHMER
BY

Jan. 29, 1963   B. STAHMER   3,075,724
CABLE GUIDE MECHANISM FOR CONSTANT TENSION REEL
Filed May 15, 1961   3 Sheets-Sheet 3

INVENTOR.
B. STAHMER

United States Patent Office 3,075,724
Patented Jan. 29, 1963

3,075,724
CABLE GUIDE MECHANISM FOR
CONSTANT TENSION REEL
Bernhardt Stahmer, 1509 Chicago St., Omaha, Nebr.
Filed May 15, 1961, Ser. No. 110,044
3 Claims. (Cl. 242—107)

This invention relates to reels of a type known as constant tension reels and more particularly it is an object of this invention to provide means for guiding a cable as it is being wound and unwound on and from such a reel.

Heretofore there has been no adequate cable guiding means developed for this type of reel because of the complexity of the problem of devising a guide means since such reels have drum portions which are of frustroconical shape.

Because of the absence of an adequate guide mechanism, it has heretofore been necessary to space the helical convolutions in the cable-receiving drum of such a reel quite far apart and to make each of the convolutions of considerable width at its entrance in order to guide or "funnel" the cable into the groove. For example, the drums of the prior art for receiving cable and such reels have often had four cable groove convolutions per each three inches of reel dimension as measured parallel to the axis of the reel. It is an object of this invention to provide a sufficiently effective guide mechanism for such a reel that the cable groove convolutions can be much closer together than heretofore, such as, for example, four or more notches to the inch, or twelve or more notches in the place where four notches have been in prior art reels.

A particular object of the invention is to provide a cable guide means for such reels in which a much greater length of cable can be received on the frustro-conical drum of reel, proportional to the size of the drum, than heretofore.

A further object is to provide a guide mechanism which effectively prevents the cable from being pulled against the sides of a cable groove during reeling and unreeling whereby the probability of a cable jumping out of its proper groove is held to a minimum and also whereby much friction is reduced since the cable need not bind against the sides of a cable groove.

A further object is to provide a reel mechanism for guiding a cable in which the guide moves in parallelism to the inclined side surface of a frustro-conical reel.

Heretofore in some uses cable guides have been disposed close to the drum. This has had the disadvantage that when the cable is pulled at an angle substantially inclined such as 45 degrees with respect to a plane normal to the drum axis, then jamming is more likely to occur, that is, a jamming of the cable guide and the reel. Another problem has been a binding effect in which a cable pulled at this angle tends to bind against portions of a reel guiding member.

Still another object is to provide a cable guide for such a reel, the cable-engaging and guiding portions of which are disposed in a position spaced a substantial distance from the drum, whereby a guided portion of the cable exists between the guide and drum which has a substantial length, the spacing having the effect of causing the cable to feed onto the drum properly without jamming, even though the remaining cable is disposed in positions extending at substantial inclinations to the guided portion of the cable.

Other and further objects and advantages of the present invention will be apparent from the following detailed description, drawings and claims, the scope of the invention not being limited to the drawings themselves as the drawings are only for the purpose of illustrating a way in which the principles of this invention can be applied.

Other embodiments of the invention utilizing the same or equivalent principles may be used and structural changes may be made as desired by those skilled in the art without departing from the present invention and the purview of the appended claims.

Figure 1:
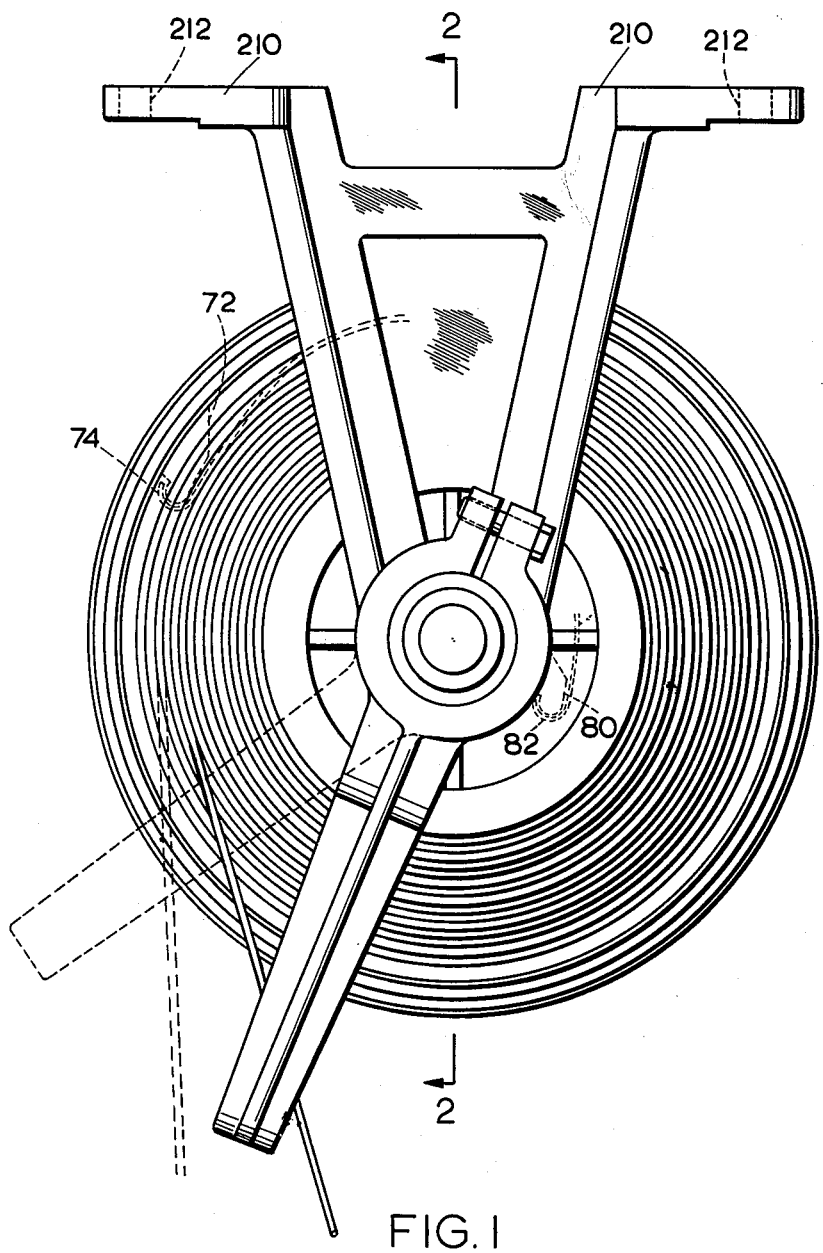
FIGURE 1 is an end elevation of a constant torque cable reel with a guide in accordance with this invention.

Referring to the drawings, a constant torsion reel is generally indicated at 10 having an axle 12 on which a coil spring-receiving housing is shown at 14 being rotatably mounted on the axle 12 by means not shown in an outer hub portion 18 of the housing, the housing having a cover 20 of generally cylindrical shape fitting between a circular end member or disc 30 of the coil spring receiving portion housing 14.

The disc 30 is attached to an inner side portion 32 of a cable-receiving drum portion of the reel, the latter being indicated at 34.

The inner end portion 32 is attached to the disc 30 by bolt 42 and the inner end 32 is rotatably mounted on axle 12 by means of a bearing 48, all of the foregoing being conventional.

Between the disc 30 and the inner end 32 is a spring-receiving cavity 50 which latter contains one or more springs of a coiled type such as the spring shown at 60.

Each spring is suitably attached to an outer portion of the spring-receiving housing 14 said outer portion being of cylindrical shape, and being shown at 62 surrounding the cavity 50.

The outer end of each spring 60 is shown in dotted lines in FIGURE 1 as suitably connected to the housing portion 62 by means of a member 72 shown in dotted lines which latter is adapted to receive a hooked end 74 of the spring 60, whereas another anchor member similar to the member 72 is shown at 80 and is attached to the axle 12 by means not shown, the anchor member 80 receiving the hooked end 82 of the spring 60 attached thereto. It is thought that dotted line representation is sufficient since all of the above described parts are conventional in the art of constant torque reels.

The drum portion 34 has an outer surface of generally frustro-conical shape, such surface being generally indicated at 90, and being provided with many helically arranged interconnected grooves 94, which latter preferably have side walls normal to the axle 12 for retaining a cable.

In accordance with this invention, the number of convolutions of the spiral groove, 94 convolutions per each inch of distance along the axle 12, can be much greater than heretofore, for example, it can be twelve or more convolutions per inch rather than four convolutions per inch as has heretofore been used, the greater number of convolutions per inch being made possible in my reel because a cable guide mechanism now to be described, renders large groove entrance area with widely spaced groove entrance guide walls unnecessary as the "funneling" into the groove of the cable is thereby made unnecessary.

It will be seen that a cable generally indicated at 100 is coiled about the drum portion 34 and in the groove 94 and that one end of the cable is anchored to the reel in any suitable fashion such as by extending through an opening 112 through the drum 34, the cable 100 having a cable clamp 114 on its inner end for preventing the cable from passing outwardly of the opening 112. For simplicity of illustration, the entire cable 100 is not shown, but it will be seen that an outer end of the cable hangs downwardly from the drum at 120 in FIGURE 2. The outer end 120 extends through a cable-engaging portion generally shown at 124 of a cable guide mechanism generally indicated at 130.

The cable guide mechanism preferably comprises four rollers 132 disposed on four sides of an opening 138 through which the cable 100 passes.

The rollers 132 are held in place by suitable mounting means generally indicated at 140 and the mounting means 140 is attached to a track follower 160 which latter has a non-round and preferably square passageway 164 therethrough for receiving a complementally shaped non-round and preferably square track member 170. The track member 170 is suitably mounted at its ends in a track member carrier 174 which latter is sufficiently spaced away from the track 170 in an area alongside the drum portion 34, that the track follower 160 is free to slide along the track 170.

The track carrier 174 is itself attached to a axle fitting 180 which latter is suitably secured to that end of the axle 12 which extends beyond the drum portion 34 and the axle fitting 180 holds the axle 12 from rotation by means of a key 182 fitted into a keyway 184 in the axle 12 and also received in a suitable keyway 190 in the axle fitting 180, the key 182 being held in place by a set screw 194 which is threadedly received in a suitable hole 196 for pressing the key 182 against the axle 12 firmly.

A mounting bracket 200 is firmly fixed to the axle fitting 180 and extends upwardly therefrom being provided with a base portion 210 through which vertical openings 212 are provided for receiving bolts, not shown, for the attachment of the reel to a portion of a building or the like disposed thereabove and not shown.

As thus described, it will be seen that in operation, as the end 120 of the cable 100 is pulled downwardly, it will be prevented from riding over the sides of the respective one of the grooves 94 from which it is being pulled because it is guided in a direction normal to the axle 12 by the guide means 130 which latter itself travels in a direction parallel to the outer surface 90 of the drum portion 34 because the cable guide 130 with its rollers is attached to the track follower 160 and the track 170 is itself parallel to the outer surface 90 of the drum portion 34, thus eliminating the problem of a cable coming out of its groove and becoming entangled and also eliminating the problem of friction from a cable binding against the side walls of its respective groove 94 whereby it is now possible for the number of groove convolutions per each inch of axle length to be as much as three times what was heretofore considered practical whereby the drum can receive a much greater quantity of cable in proportion to its size.

A further feature of the reel and guide assembly is the provision of a means for preventing the cable or cord 120 from accidentally coming out of its groove. Such means comprises a retainer bar 300 which has a portion 310 disposed parallel to the conically shaped portion of the reel and disposed spaced from, but so close to the walls of the groove convolutions 94 that there is not space enough between the portion 310 and the walls of the groove convolutions 94 for the cable 120 to pass therebetween. The retainer bar 300 is attached at its ends by suitable screws 312 to the mounting bracket 200.

The retainer 300 will be seen to be of much lesser width in a direction transversely of the reel axis than the diameter of the reel whereby it is properly described as a retainer bar and whereby its cost relative to its purpose is relatively little.

Figure 2:
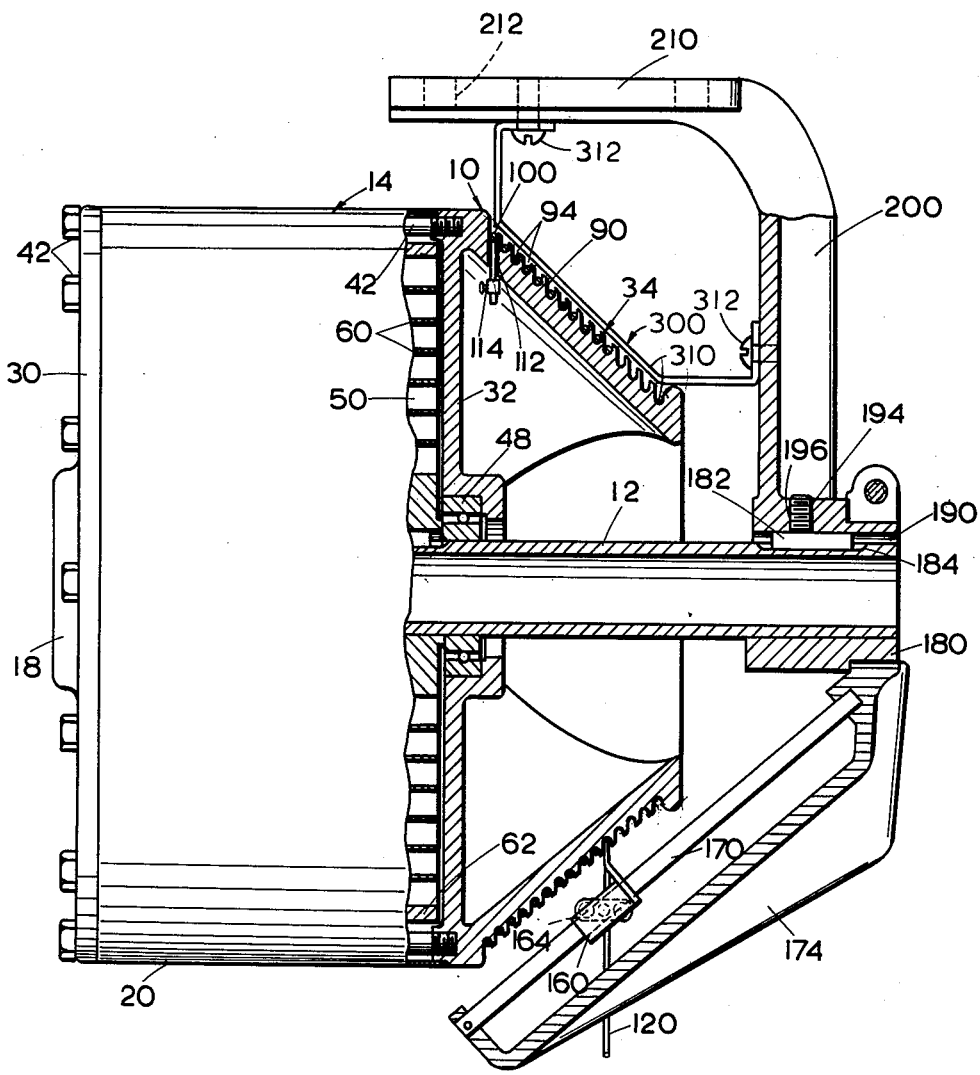
FIGURE 2 is a sectional view taken along the line 2—2 of FIGURE 1.
Figure 3:
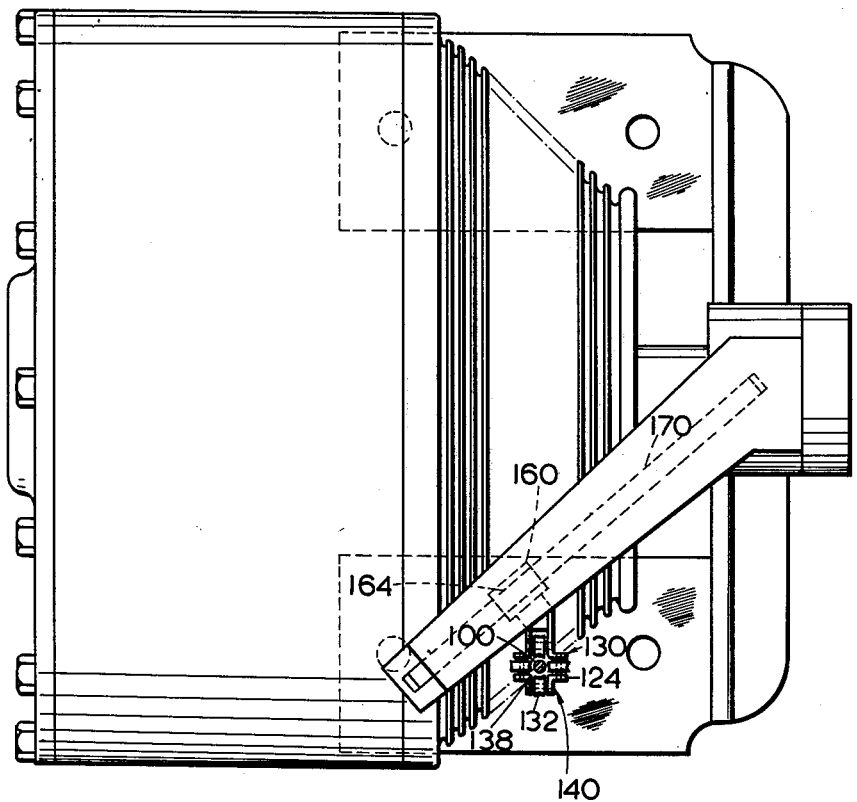
FIGURE 3 is a view of the reel shown as seen from the bottom in FIGURE 1.

It will be seen that the cable guide has cable-engaging and guiding portions (the rollers 132) of which are disposed in a position spaced a substantial distance from the drum, as seen in FIGURE 2, whereby a guided portion of the cable exists between the guide or guide mechanism 130 and the drum, which guided portion has a substantial length, the spacing having the effect of causing the cable to feed onto the drum properly without jamming, even at times when the remaining cable is disposed in positions extending at substantial inclinations to the guided portion of the cable.

From the foregoing description, it is thought to be obvious that a cable guide mechanism for constant torque reel constructed in accordance with my invention is particularly well adapted for use, by reason of the convenience and facility with which it may be assembled and operated, and it will also be obvious that my invention is susceptible of some change and modification without departing from the principles and spirit thereof, and for this reason, I do not wish to be understood as limiting myself to the precise arrangement and formation of the several parts herein shown in carrying out my invention in practice, except as claimed.

I claim:

1. In combination: a reel having: a supporting frame, a drum rotatable about an axle fixed to said frame, said drum having retraction spring means, said drum having helical groove means therein comprising spaced connected helical groove convolutions, and said drum being of a lesser diameter at one end than at its other end whereby its sides are generally inclined with respect to its axis, an elongated flexible member anchored to said drum at the larger end of said drum and having a free end at the smaller end of said drum, and said spring means being so correlated with said drum that when said member is pulled from said groove at the smaller end of said drum said drum rotates and progressively tightens said retraction spring as said member is unwound whereby upon release of tension on said free end of said flexible member, said spring means causes said drum to turn in a direction for retracting said flexible member, and a guide means for said flexible member comprising an elongated guide track mounted on said frame and disposed generally parallel to one of the said inclined sides of said drum, a guide track follower adapted to slide longitudinally on said track and guide means for said flexible member mounted on said follower and having a flexible member receiving opening and said opening receiving said flexible member therethrough and being disposed below the periphery of said drum, said guide means having wall surfaces at said opening disposed for engaging said flexible member on sufficient different sides of said flexible member so as to maintain that guided portion of said flexible member which is disposed between said guide opening and the respective groove convolution in a straight line even though the remainder of said flexible member is disposed in positions extending at substantial inclinations to the said guided portion, the flexible member engaging portions of said cable guide being disposed in positions spaced a substantial distance from said drum so that said guided portion of said flexible member is of a substantial length, and said reel being free of any parts in which said flexible member can become jammed whereby the remainder of the extended portion of said flexible member beyond said cable engaging guide can be disposed at substantial angles of inclination with respect to said guided portion of said flexible member without substantial interference in the reeling.

2. In combination: a reel having: a supporting frame, a drum rotatable about an axle fixed to said frame, said drum having retraction spring means, said drum having helical groove means therein comprising spaced connected helical groove convolutions, and said drum being of a lesser diameter at one end than at its other end whereby its sides are generally inclined with respect to its axis, an elongated flexible member anchored to said drum at the larger end of said drum and having a free end at the smaller end of said drum, and said spring means being so correlated with said drum that when said member is pulled from said groove at the smaller end of said drum said drum rotates and progressively tightens said retraction spring as said member is unwound whereby upon release of tension on said free end of said flexible member, said spring means causes said drum to turn in a direction for retracting said flexible member, and a guide means for said flexible member comprising an elongated guide track mounted on said frame and disposed generally parallel to one of the said inclined sides of said drum, a guide track follower adapted to slide longitudinally on said track and guide means for said flexible member mounted on said follower and having a flexible member receiving opening and said opening receiving said flexible member therethrough and being disposed below the periphery of said drum, said guide means having wall surfaces at said opening disposed for engaging said flexible member on sufficient different sides of said flexible member so as to maintain that guided portion of said flexible member which is disposed between said guide opening and the respective groove convolution in a straight line even though the remainder of said flexible member is disposed in positions extending at substantial inclinations to the said guided portion, the flexible member engaging portions of said cable guide being disposed in positions spaced a substantial distance from said drum so that said guided portion of said flexible member is of a substantial length, and said reel being free of any parts in which said flexible member can become jammed whereby the remainder of the extended portion of said flexible member beyond said cable engaging guide can be disposed at substantial angles of inclination with respect to said guided portion of said flexible member without substantial interference in the reeling, said reel supporting frame having a collar portion receiving the axle of said reel, said means for mounting said guide track on said frame including an arm having one end fixed to said collar.

3. The combination of claim 1 in further combination with a retainer bar having a portion disposed parallel to and spaced from said drum, said retainer bar being disposed sufficiently close to said drum so as to prevent said flexible member from undesirably coming out of said groove convolutions, said retainer wall extending transversely of said groove convolutions, and means attaching said retainer bar to said reel frame, said retainer bar being disposed at a side of said reel diametrically opposite from said cable guide and being of much lesser width in a direction transversely of the reel axis than the reel axis itself for economy of manufacture.

References Cited in the file of this patent
UNITED STATES PATENTS

| | | |
|---|---|---|
| 1,659,160 | Richards | Feb. 14, 1928 |
| 2,451,100 | Lecompte | Oct. 12, 1948 |
| 2,923,491 | Fischer et al. | Feb. 2, 1960 |
| 2,939,680 | Powell | June 7, 1960 |
| 2,958,509 | Mitchell | Nov. 1, 1960 |